US008519951B2

(12) United States Patent
Franko et al.

(10) Patent No.: US 8,519,951 B2
(45) Date of Patent: Aug. 27, 2013

(54) CLOUD IMAGE REPLACEMENT FOR TERRAIN DISPLAY

(75) Inventors: Bethany L. Franko, Seattle, WA (US); Domenic S. Giuntoli, Seattle, WA (US); Nino Senoadi, Bothell, WA (US); Calsee N. Robb, Seattle, WA (US); Sean A. Munson, Little Silver, NJ (US); Robert J. Bengtsson, Mukilteo, WA (US); Bradley J. Mitchell, Snohomish, WA (US); Henry V. Fletcher, III, Everett, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 12/846,967

(22) Filed: Jul. 30, 2010

(65) Prior Publication Data
US 2010/0283637 A1 Nov. 11, 2010

Related U.S. Application Data

(63) Continuation of application No. 11/567,457, filed on Dec. 6, 2006, now Pat. No. 7,777,718.

(51) Int. Cl.
*G09G 5/00* (2006.01)
*H04N 7/18* (2006.01)

(52) U.S. Cl.
USPC .......................... 345/156; 348/117; 348/144

(58) Field of Classification Search
USPC .................................. 345/156; 348/117, 144
See application file for complete search history.

(56) References Cited

U.S. PATENT DOCUMENTS

| 5,187,754 | A | * | 2/1993 | Currin et al. ................. 382/284 |
| 5,534,917 | A |   | 7/1996 | MacDougall |
| 5,612,901 | A | * | 3/1997 | Gallegos et al. ................. 702/3 |
| 5,751,289 | A | * | 5/1998 | Myers ............................ 345/419 |
| 7,058,204 | B2 |  | 6/2006 | Hildreth et al. |
| 2001/0043323 | A1 | * | 11/2001 | Sullivan et al. .............. 356/5.01 |
| 2004/0239688 | A1 | * | 12/2004 | Krajec .......................... 345/629 |
| 2005/0195096 | A1 | * | 9/2005 | Ward et al. ................ 340/995.14 |

OTHER PUBLICATIONS

"Aircraft Cabin Connectivity Just Like in Your Home. Almost.", Consulting for Business Aviation, Wavelink Publications, www.elliottaviation.com, vol. 6, 2001, 2 pages.

* cited by examiner

*Primary Examiner* — Jonathan Boyd
(74) *Attorney, Agent, or Firm* — Yee & Associates, P.C.

(57) ABSTRACT

A method and apparatus for displaying an image of terrain obtained from a position above the terrain. An image of an object is detected in the image of the terrain for an object that is positioned between the terrain and the position above the terrain. The detected image of the object is replaced in the image of the terrain with replacement image data. For example, the replacement image data may be image data for the terrain below the object. The image of the terrain with the replacement image data may be displayed. The method and apparatus may be used to replace images of clouds in images of the surface of the earth below an aircraft with image data for the surface of the earth below the clouds.

15 Claims, 7 Drawing Sheets

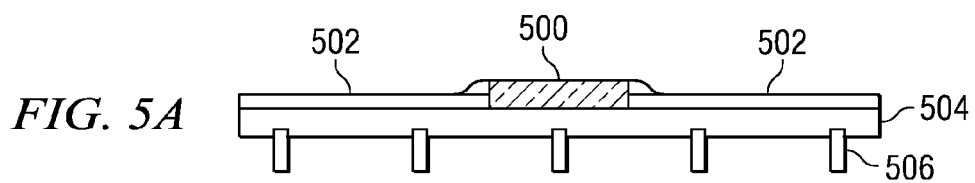
*FIG. 5A*
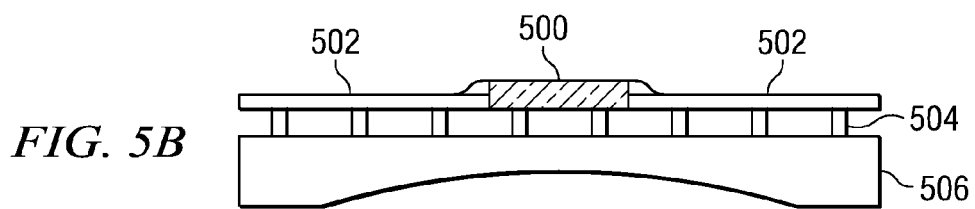
*FIG. 5B*
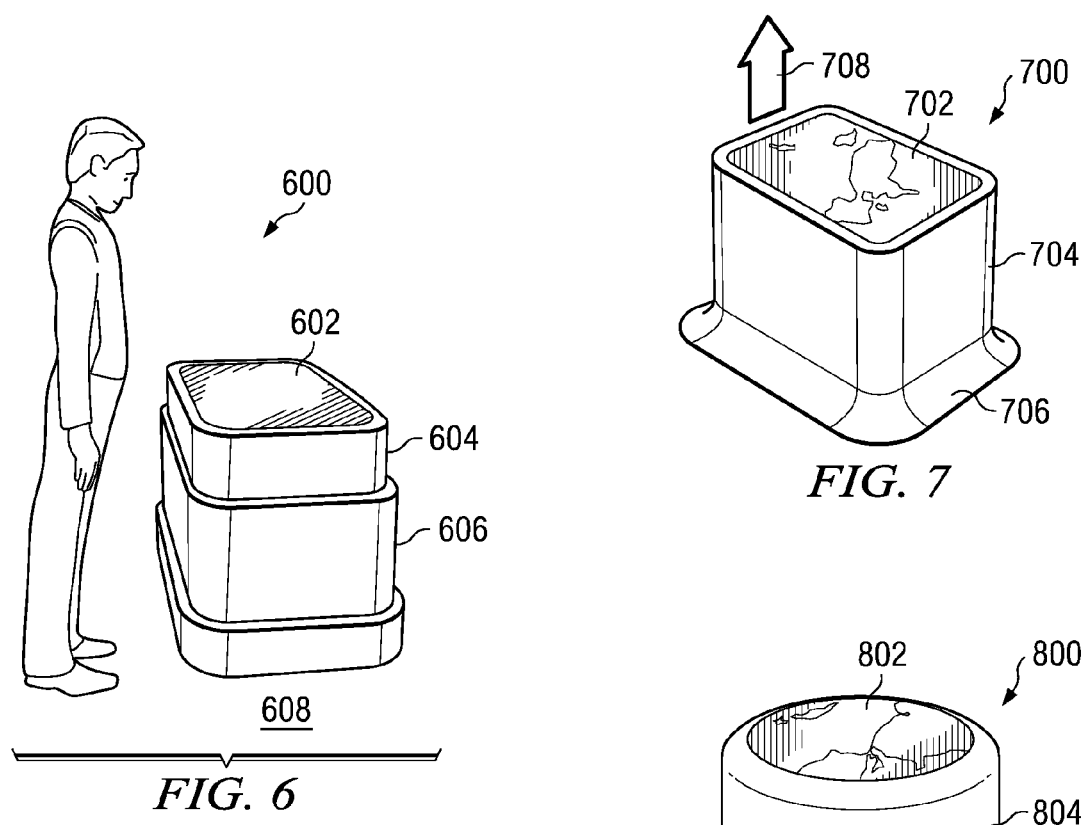
*FIG. 6*
*FIG. 7*
*FIG. 8*

CLOUD IMAGE REPLACEMENT FOR TERRAIN DISPLAY

This application is a continuation of prior U.S. patent application Ser. No. 11/567,457, filed Dec. 6, 2006, now U.S. Pat. No. 7,777,718.

BACKGROUND INFORMATION

1. Field of Invention

The present invention relates generally to an improved data processing system and in particular to a method and apparatus for presenting video data. Still more particularly, the present invention relates to a method, apparatus, and computer usable program code for displaying images of the surface of the earth over which an aircraft is flying.

2. Background Description

Passengers traveling on aircraft over long distances are offered different in-flight entertainment (IFE) options to pass the time. In-flight entertainment includes providing options, such as personal televisions, which provide different entertainment options, such as movies, music, and video games. The video entertainment may include the broadcasting of new and classic films, as well as comedies, documentaries, children's shows, and drama series. Through personal televisions the passengers may select, from the different channels provided, different types of entertainment that they desire. Other in-flight entertainment options include providing passengers access to the Internet as well as other communication features.

Passengers have an opportunity to see the earth from a new perspective as they travel to their destination. Another in-flight entertainment option is a Passenger Flight Information Display (PFIDS). This type of show is an in-flight information video channel broadcast through personal televisions and video cabin screens. Typically, these air shows include displaying a map that illustrates the path thus far, projected path, and current position and direction of the plane. These maps may be displayed using actual satellite images to provide the passengers a realistic view of the flight terrain. These maps may include geopolitical borders, city names, and points of interest presented along with the current location of the aircraft. In this manner, passengers may look out the windows to see different features. The displays from a Passenger Flight Information Display also include flight information, time zones, custom graphics, safety briefings as well as other messages.

SUMMARY OF THE INVENTION

An advantageous embodiment of the present invention provides a flight portal apparatus for displaying a virtual view of a surface of the earth below an aircraft. The apparatus comprises a data processing system and a display device, connected to the data processing system, wherein the display device is positioned to generate a display that is substantially horizontal relative to a floor of an aircraft in a manner that simulates a portal in the aircraft. A camera system is connected to the data processing system, wherein the camera system generates video data of the surface of the earth below the aircraft. A gesture detection system is connected to the data processing system. Video processing software executed by the data processing system receives video data from the camera system, identifies a location and orientation of the aircraft, identifies a map from the location, overlays the map onto the video data to form display image data, and sends the display image data to the display device, wherein a virtual view of the surface of the earth below the aircraft is displayed on the display device.

Another embodiment of the present invention provides a method for displaying a virtual view of a surface of the earth below an aircraft. Video data of the surface of the earth below the aircraft is received from a camera system in the aircraft. The video data of the surface of the earth below the aircraft is displayed on a display device in the aircraft, wherein the display device is substantially parallel to a floor in a passenger cabin in the aircraft such that a virtual view of the surface of the earth below the aircraft is generated.

Yet another embodiment of the present invention provides a display apparatus having a display device. The display device configured to simulate a portal in an aircraft. A controller is connected to the display device. The controller receives video data from a camera system on an airplane in which the camera system generates video data of a surface of the earth below the aircraft and displays the video data on the display and displays the video data of the surface of the earth on the display device to create a virtual view of the surface of the earth in the aircraft.

The features, functions, and advantages can be achieved independently in various embodiments of the present invention or may be combined in yet other embodiments.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an advantageous embodiment of the present invention when read in conjunction with the accompanying drawings, wherein:

FIGS. 5A and 5B are cross-sectional views of a flight portal in accordance with an advantageous embodiment of the present invention;

FIG. 6 is a diagram of a telescoping flight portal in accordance with an advantageous embodiment of the present invention;

FIG. 7 is a diagram illustrating another form for a flight portal in accordance with an advantageous embodiment of the present invention;

FIG. 8 is yet another illustration of a flight portal in accordance with an advantageous embodiment of the present invention;

DETAILED DESCRIPTION OF THE INVENTION

Figure 1:
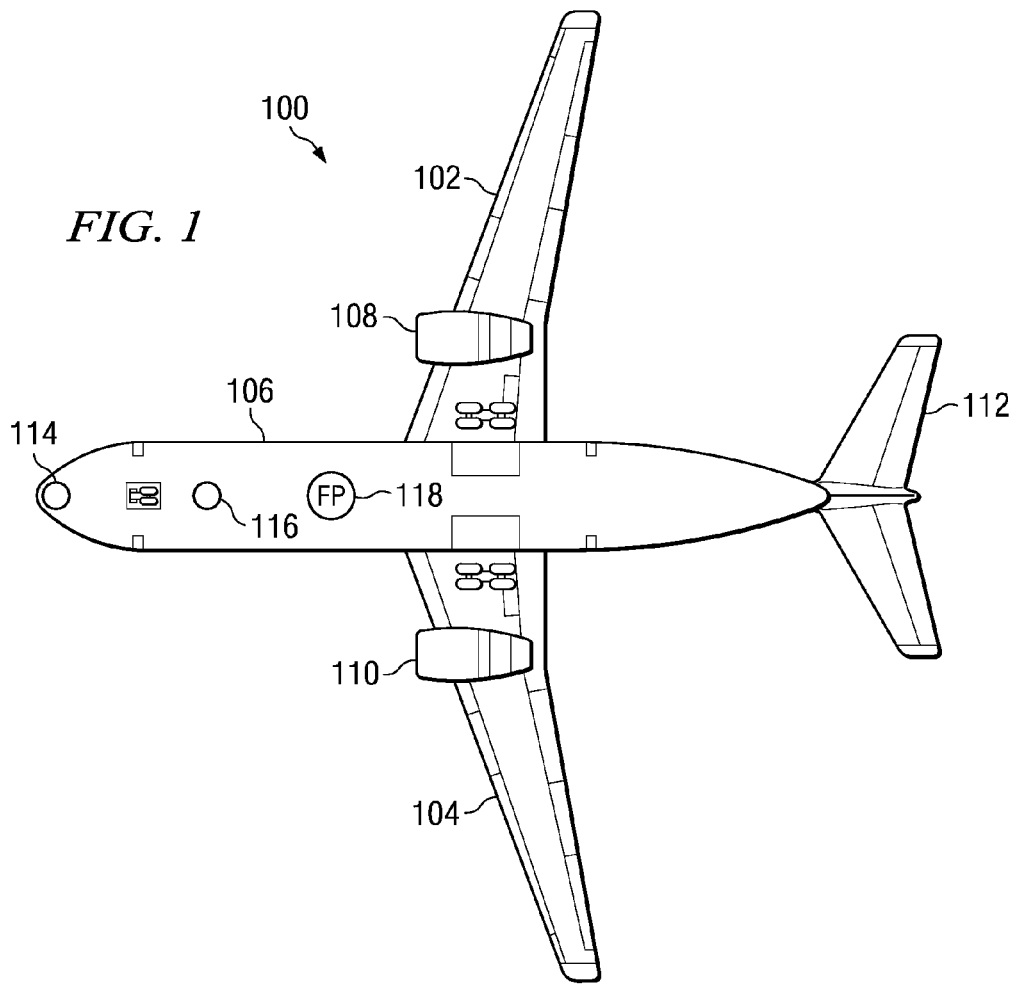
FIG. 1 is a diagram of an aircraft in which an advantageous embodiment the present invention may be implemented.

With reference now to the figures, and in particular, with reference to FIG. 1, a diagram of an aircraft is depicted in which an advantageous embodiment of the present invention may be implemented. In this illustrative example, aircraft 100 has wings 102 and 104 attached to body 106. Aircraft 100 includes wing mounted engine 108, wing mounted engine 110, and tail 112. Additionally, aircraft 100 also includes camera systems 114 and 116. These camera systems provide video of the terrain as aircraft 100 travels over the terrain. In these advantageous embodiments, aircraft 100 includes a flight portal system (FPS) 118 that allows passengers to see the terrain of the earth from a new perspective.

The different illustrative embodiments recognize that although current in-flight systems provide passengers entertainment and information, these systems only display a map and a location of the aircraft on the map to the passenger. Passengers are required to look out the windows to see the terrain.

The different advantageous embodiments recognize that problems occur with limited viewing areas and with the small size of the windows limiting the view. Further, these windows are located such that a passenger may have to look out a window on the other side of the aircraft to see different features of interest that may be pointed out in the Passenger Flight Information Display. Currently, passengers may look out the window and see a spectacular view without knowing what they are flying over. The passengers may not be able to identify man made or natural formations or geopolitical areas or cities presented through a Passenger Flight Information Display.

Thus, the advantageous embodiments of the present invention provide flight portal system 118 in aircraft 100 for use in providing an improved presentation of flight information to passengers. Flight portal system 118 in these advantageous embodiments displays a virtual view of a surface of the earth below aircraft 100. Flight portal system 118 allows passengers to see the terrain or land over which aircraft 100 flies using camera systems 114 and 116 along with other information. In this manner, passengers may see video of the terrain over which the plane is flying with information and identification of points or areas of interest indicated on the display of the terrain without having to look out a window and try to correlate what they see through the window with what is being displayed on the screen.

In this manner, the different advantageous embodiments of the present invention provide passengers an ability to discover the world while flying in the air. Flight portal system 118 opens up the world outside aircraft 100 and enriches the flying experience for the passengers by allowing them to view the outside in a new manner in which they understand what they are seeing below them.

Figure 2:
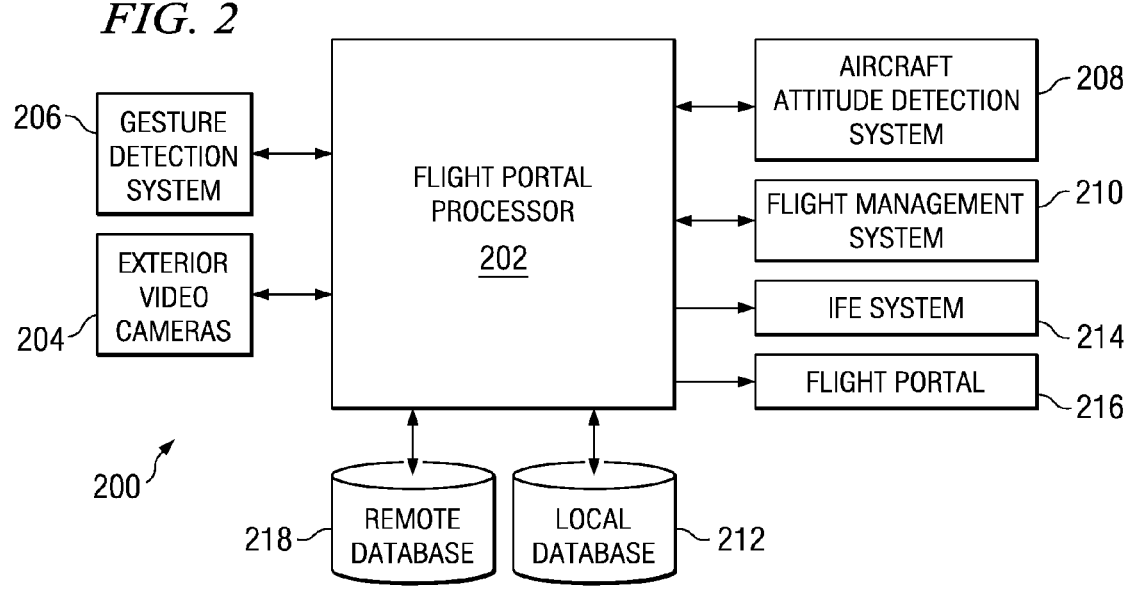
FIG. 2 is a diagram illustrating components used in a flight portal system in accordance with an advantageous embodiment of the present invention.

Turning now to FIG. 2, a diagram illustrating components used in a flight portal system is depicted in accordance with an advantageous embodiment of the present invention. Flight portal system 200 is an example of flight portal system 118 in FIG. 1. Flight portal system 200 includes flight portal processor 202, exterior video cameras 204, gesture detection system 206, aircraft attitude detection system 208, flight management system 210, local database 212, in-flight entertainment (IFE) system 214, flight portal 216, and remote database 218.

Flight portal processor 202 is a computer or some other data processing device that is used to receive video streams from exterior video cameras 204 and overlay those video streams with information from local database 212 for display on flight portal 216.

Gesture detection system 206 is used to detect user input in the area of flight portal 216. Gesture detection system 206 may use cameras mounted in the area of flight portal 216 to detect gestures made by passengers. The video data from these cameras is used to identify gestures made by passengers in the area of flight portal 216 to initiate various functions with respect to the display of the terrain and other information.

Additionally, gesture detection system 206 also includes processes for isolating and tracking gestures made by, for example, the hand of a passenger. These gestures are converted into user inputs to control the display of images and other functions. Gesture detection system 206 may be implemented using a technology, such as GestPoint™ or GroundFX which are available from Gesture Tech, Inc. Of course, any system in which gestures are translated into user input signals, may be implemented into gesture detection system 206. Although the illustrated examples use a gesture detection system as input, other types of user interfaces may be used. For example, touch screens, touch pads, track balls, joy sticks, mouse, and keyboards may be used as alternatives or additions to gesture detection system 206.

Flight management system 210 may be implemented using existing equipment on an aircraft. Flight portal processor 202 receives altitude information to size maps to be overlaid on the video data received from exterior video cameras 204.

The location information from the flight management system 210 is used to identify the appropriate maps to display with the video data from exterior video cameras 204 on flight portal 216. Flight management system 210 provides location information, such as latitude, longitude, heading, altitude, and track angle. This information may be derived by different mechanisms in systems present on an aircraft. For example global positioning systems, and gyros may provide information. Additionally, flight management system 210 may receive ground based telemetry. Also depending on the particular implementation, terrain recognition may be provided through flight management system 210. As another example, altitude may be obtained from a global positioning system, a pressure altimeter, or a radio altimeter. Thus, flight management system 210 may encompass many different systems that provide information needed to identify the location of the aircraft.

Aircraft attitude detection system 208 is implemented in these examples using existing aircraft attitude systems found in an aircraft. The pitch angle and roll angle from aircraft attitude detection system 208 are used to identify the appropriate view angle for the maps to display with the video data from exterior video cameras 204 on flight portal 216.

Local database 212 contains maps that may be overlaid with the video data received from exterior video cameras 204. Additionally, local database 212 may include other information, such as images, text information, historical data, and graphics that may be displayed on flight portal 216. In-flight entertainment system 214 may be implemented using existing in-flight entertainment system equipment on an aircraft. For example, in-flight entertainment system 214 may include personal televisions, cabin displays, and audio outputs located within the cabin of the aircraft.

Remote database 218 is a remote database located on the ground in these examples. Remote database 218 may include other data, such as satellite images, additional maps, or other information that may not be found in local database 212. Alternatively, remote database 218 may be omitted and all of the information used by flight portal processor may be stored in local database 212, depending on the particular implementation.

In these examples, exterior video cameras 204 may be implemented using already existing video cameras on an aircraft. Exterior video cameras 204 may be implemented using cameras 114 and 116 in FIG. 1. Alternatively, video cameras may be mounted to capture images from the exterior of the aircraft. Exterior video cameras 204 are designed to record video data of forward and downward views. In these examples, exterior video cameras 204 do not physically move. Instead, these cameras have a wide angle view that allows for video data to be gathered such that portions of the video data are presented on flight portal 216 through a pan, rotate, or to zoom input from a passenger. Alternatively, exterior video cameras 204 may include multiple video cameras that provide for different views. These views include, for example, forward, aft, down, left, and right. The data from these different cameras may be put together to provide a high resolution hemispherical video image that may be presented through flight portal 216.

Exterior video cameras 204 may be implemented using different types of video cameras depending on the implementation. For example, normal video cameras that present images normally seen may be used in conjunction with an infrared or a millimeter wave radar camera. A millimeter wave radar camera uses a long-wave infrared sensor to gather data about the ground. An example of a millimeter wave camera that may be used is EVS-1000, which is available from Max-Viz, Inc. The millimeter wave camera may be used when conditions are poor for the normal video camera. For example, the millimeter wave camera may be used when cloudy conditions are present or when it is dark outside. As another example, both cameras may be used and images overlaid when transient conditions exist.

Flight portal 216 may be implemented using different display technologies, for example, a video projection system may be used to display the images and data to the passengers. In the advantageous embodiments, a liquid crystal display is used to implement flight portal 216 in these examples. Of course, other technologies, such as a plasma display system, may be used depending on the particular implementation.

Figure 3:
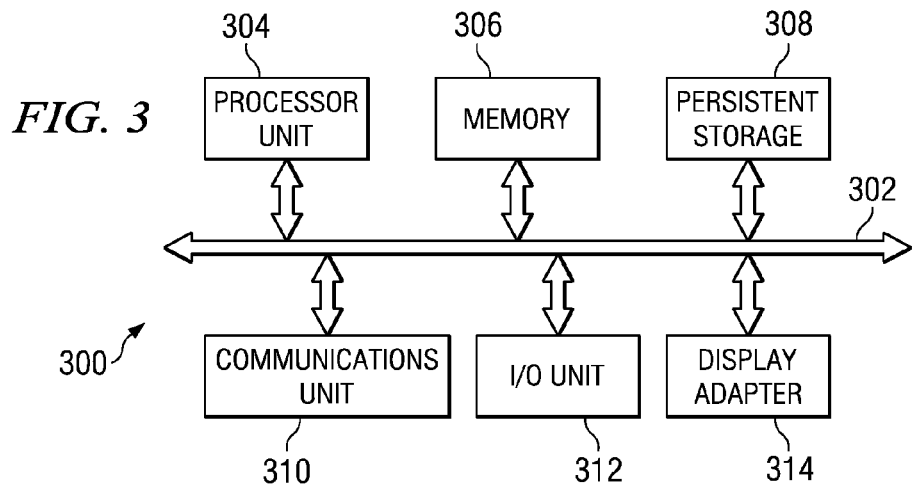
FIG. 3 is a diagram of a data processing system in accordance with an advantageous embodiment of the present invention.

Turning now to FIG. 3, a diagram of a data processing system is depicted in accordance with an advantageous embodiment of the present invention. Data processing system 300 may be used to implement flight portal processor 202 in FIG. 2. In this illustrative example, data processing system 300 includes communications fabric 302, which provides communications between processor unit 304, memory 306, persistent storage 308, communications unit 310, I/O unit 312, and display adapter 314.

Processor unit 304 serves to execute instructions for software that may be loaded into memory 306. Processor unit 304 may be a set of one or more processors or may be a multi-processor core, depending on the particular implementation. Further processor unit 304 may be implemented using one or more heterogeneous processor systems in which a main processor is present with secondary processors on a single chip. Memory 306, in these examples, may be, for example, a random access memory. Persistent storage 308 may take various forms depending on the particular implementation. For example, persistent storage 308 may be, for example, a hard drive, a flash memory, a rewritable optical disk, a rewritable magnetic tape, or some combination of the above.

Communications unit 310, in these examples, provides for communications with other data processing systems or devices. In these examples, communications unit 310 is a network interface card. I/O unit 312 allows for input and output of data with other devices that may be connected to data processing system 300. For example, I/O unit 312 may provide a connection for user input through a keyboard and mouse. Further, I/O unit 312 may send output to a printer. Display adapter 314 provides a mechanism to display information to a user.

Instructions for the operating system and applications or programs are located on persistent storage 308. These instructions may be loaded into memory 306 for execution by processor unit 304. The processes of the different embodiments may be performed by processor unit 304 using computer implemented instructions, which may be located in a memory, such as memory 306.

Figure 4:
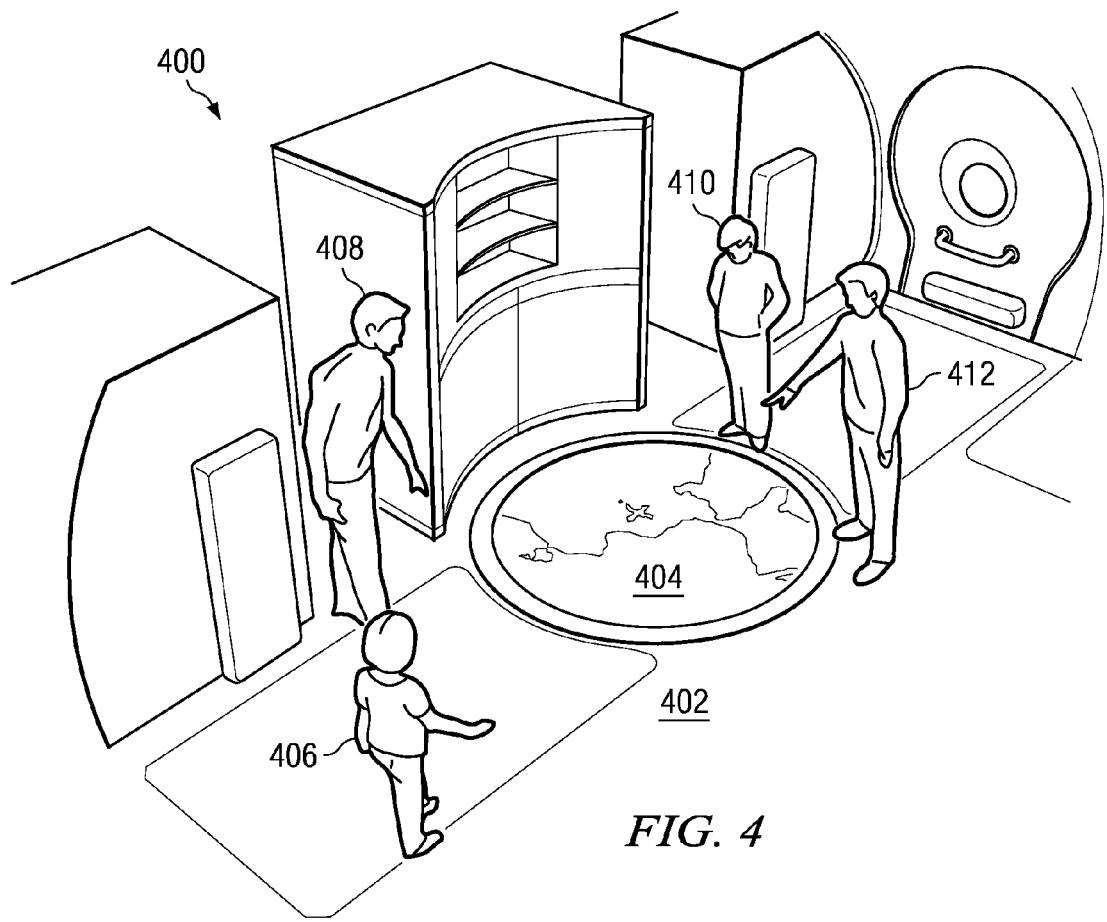
FIG. 4 is a diagram of a flight portal in accordance with an advantageous embodiment of the present invention.

With reference now to FIG. 4, a diagram of a flight portal is depicted in accordance with an advantageous embodiment of the present invention. Cabin 400 is an example of an interior of an aircraft, such as aircraft 100 in FIG. 1. In this depicted illustration, cabin 400 has floor 402 with flight portal 404 located within floor 402. As illustrated, flight portal 404 provides passengers 406, 408, 410, and 412, an ability to see what they are flying over within the aircraft and to access information about what is outside of the aircraft.

As can be seen in this example, flight portal 404 is mounted horizontally in floor 402 of cabin 400. Flight portal 404 provides a new perspective of the earth while passengers 406, 408, 410, and 412 are flying. In particular, flight portal 404 allows these passengers to see much more of the ground than they can presently in currently available systems. Flight portal 404 allows passengers 406, 408, 410, and 412, an ability to see real time views associated with their flight. Additionally, flight portal 404 allows for a shared experience between these passengers in a manner that orients the passengers in time and space while building community and encouraging passenger movement and interaction within the aircraft.

Although flight portal 404 depicted in FIG. 4 is mounted as being flush or substantially flush with floor 402 in FIG. 4, flight portal 404 may be mounted in other ways and may take other shapes other than a circular shape as shown in this figure.

Turning now to FIGS. 5A and 5B, cross-sectional views of a flight portal are depicted in accordance with an advantageous embodiment of the present invention. FIG. 5A is a side cross-sectional view of flight portal 404 in FIG. 4 and FIG. 5B is a forward cross-sectional view of flight portal 404 in FIG. 4. In this example, display device 500 is used in flight portal 404 in FIG. 4. Display device 500 is mounted within a hole within floor panels 502. These floor panels are located over seat tracks, such as seat track 504.

Seat tracks 504 are mounted over floor structure 506 within the aircraft. In these examples, the different power and video connections to display device 500 are not shown, but are present to connect display device 500 to a flight portal processor, such as flight portal processor 202 in FIG. 2.

Turning now to FIG. 6, a diagram of a telescoping flight portal is depicted in accordance with an advantageous embodiment of the present invention. In this example, flight portal 600 is a telescoping flight portal in which display device 602 is mounted in moveable section 604. In turn, moveable section 604 is mounted to moveable section 606. With these moveable sections, display device 602 may be moved upwards and downwards with respect to floor 608. In this manner, flight portal 600 may retract into a position that is out of the way when not in use. Further, in this example, flight portal 600 has a rectangular shape rather than a circular shape as shown in flight portal 404 in FIG. 4.

Turning next to FIG. 7, a diagram illustrating another form for a flight portal is depicted in accordance with an advantageous embodiment of the present invention. In this example, flight portal 700 has display device 702 mounted within structure 704. Structure 704 is covered with elastic material 706, which stretches or extrudes when structure 704 moves in an upward direction along arrow 708. Again, as with flight portal 600 in FIG. 6, flight portal 700 may retract display device 702 when flight portal 700 is not in use.

Turning now to FIG. 8, yet another illustration of a flight portal is depicted in accordance with an advantageous embodiment of the present invention. In this example, flight portal 800 contains circular display device 802 within mounting structure 804. Mounting structure 804 is attached to floor 806 and does not move in this example.

Further, all of the depicted examples illustrate a flight portal being mounted within the floor of an aircraft. The flight portal may be placed in other locations and/or orientations, such as on a wall or ceiling depending on the particular implementation. A ceiling-mounted overhead portal, for example, may show a video or graphical view of the nighttime sky with graphical overlay of astronomical information, such as constellations. A floor mounted flight portal is preferred in these examples to provide a better perspective for passengers viewing the terrain over which they are flying.

Figure 9:
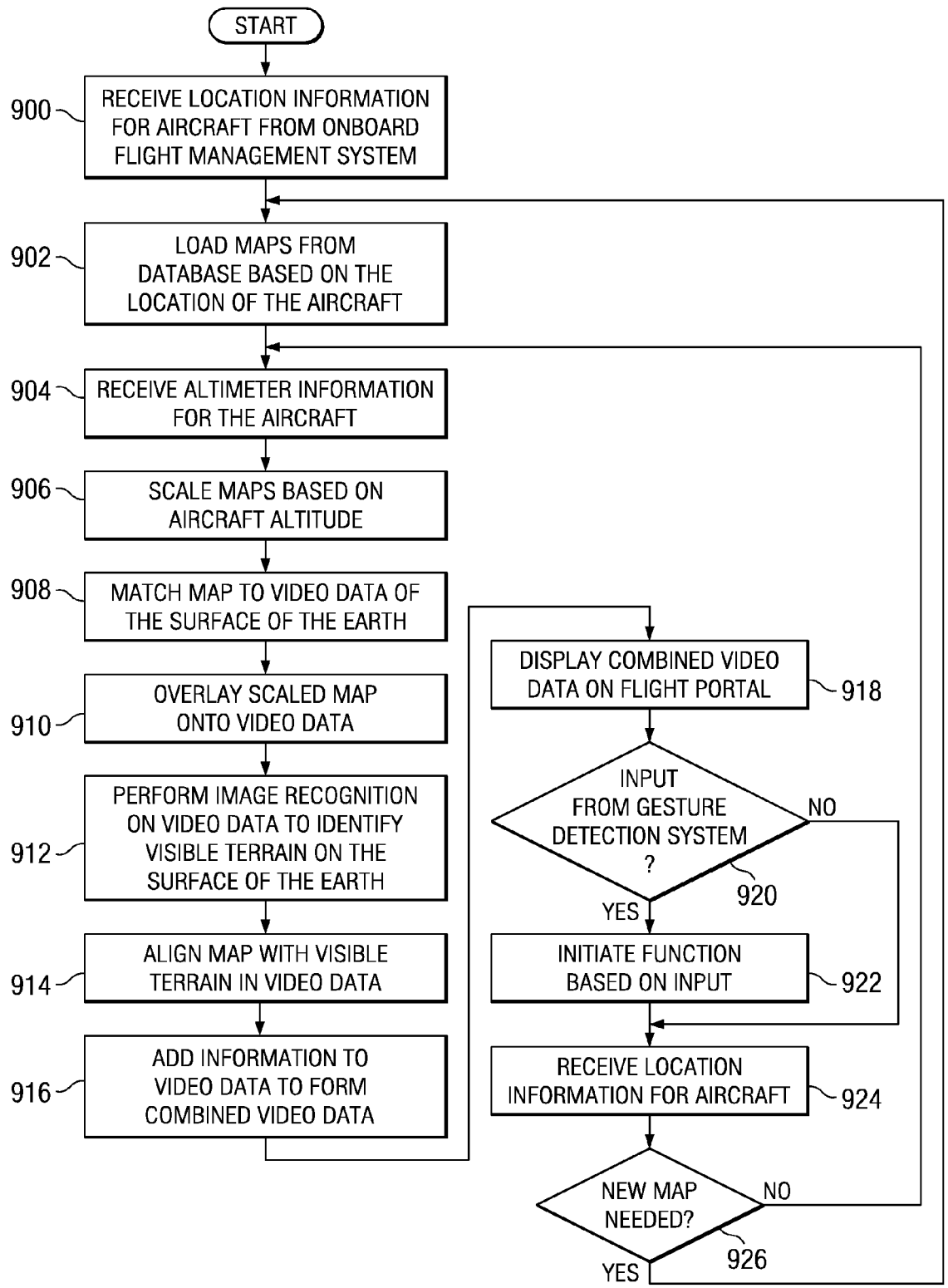
FIG. 9 is a flowchart of a process for presenting a virtual downward view outside an aircraft in accordance with an advantageous embodiment of the present invention.

Turning now to FIG. 9, a flowchart of a process for presenting a virtual downward view outside an aircraft is depicted in accordance with an advantageous embodiment of the present invention. The process illustrated in FIG. 9 may be implemented in flight portal processor 202 in FIG. 2. This process enables passengers to have a downward looking virtual view outside of the aircraft and uses real time flight views from cameras. Additionally, this process may overlay or add additional information to the view.

The process begins by receiving location information for aircraft from an onboard flight management system (operation 900). Maps are loaded from a database based on the location of the aircraft (operation 902). Altimeter information for the aircraft is then received (operation 904). Maps are scaled based on the aircraft altitude obtained in the received altimeter information (operation 906). These maps contain various features to help passengers become better oriented with the video data from the exterior cameras. The maps may include identifications of rivers, cities, mountains, or other terrain. Further, the maps may include boundaries of countries or other regions.

The maps are then matched to video data of the surface of the earth (operation 908). This video data is real time video data of the ground over which the aircraft is currently flying. The scaled map is overlaid onto the video data incorporating aircraft attitude information (operation 910).

Next, image recognition is performed on the video data to identify visible terrain on the surface of the earth (operation 912). The map is then aligned with the visible terrain in the video data (operation 914). Information is added to the video data to form combined video data (operation 916). This information may take various forms. For example, the information may be textual information about the terrain. The information also may be graphics or images relating to the terrain. Also, information about cities, countries, or points of interest may be presented through this operation. The information also may be unrelated to the ground over which the aircraft is traveling. For example, the information may include welcome information, advertisements, or instructions for using the flight portal. The combined video data is displayed on the flight portal (operation 918).

Next, the process determines if input has been received from the gesture detection system (operation 920). If user input has been received, a function is initiated based on the user input (operation 922). These functions may take various forms. For example, the function may be to zoom in on a point identified by a passenger or to retrieve information about a city, country, or point of interest.

Location information is received for the aircraft (operation 924). Another determination is made as to whether new map data is needed (operation 926). The map data may be one or more "maps". As the aircraft travels, new map data may be needed because of the new portion of the ground that is captured in the video data by the cameras may not correspond to the map data that is currently being used.

If new map data is needed in operation 926, the process returns to operation 902. If new map data is not needed, the process returns to operation 904. Turning back to the determination made in operation 920, if input is not received from the gesture detection system, the process proceeds directly to step 924 to receive location information for the aircraft.

Figure 10:
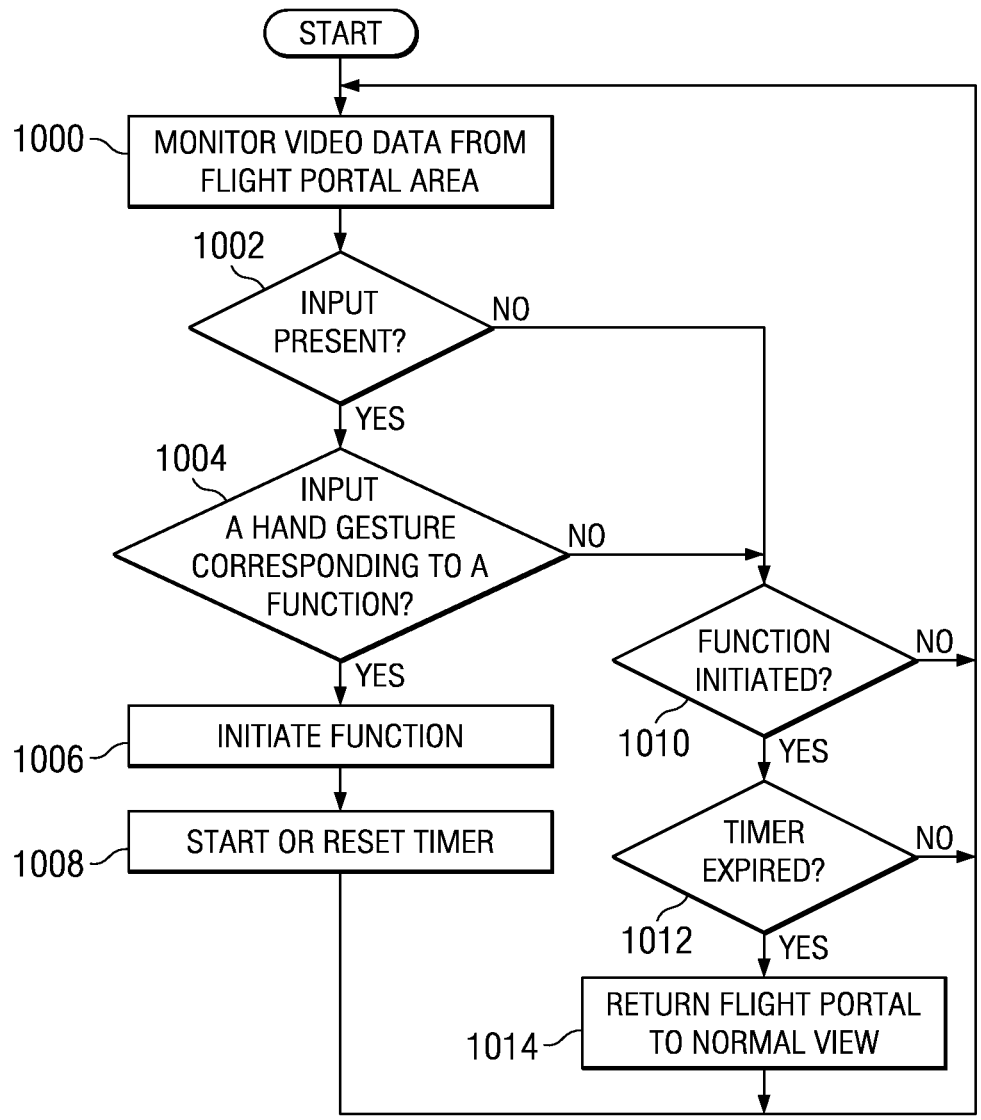
FIG. 10 is a flowchart of a process for handling user input in accordance with an advantageous embodiment of the present invention.

Turning now to FIG. 10, a flowchart of a process for handling user input is depicted in accordance with an advantageous embodiment of the present invention. The process in FIG. 10 may be implemented in a hand gesture system, such as gesture detection system 206 in FIG. 2. This process is used to identify user inputs to initiate different functions for a flight portal. When an output is generated by this process, the output is considered an input used in operation 920 in FIG. 9.

The process begins by monitoring video data from the flight portal area (operation 1000). This area may be from a portion of a cabin in an aircraft where the flight portal is located, such as cabin 400 in FIG. 4. A determination is made as to whether input is present (operation 1002). This input in operation 1002 may be provided by video data from a camera in the area of the flight portal. Input may be considered to be present if movement is present in video data.

If input is present, the process determines whether the input is a hand gesture corresponding to a function (operation 1004). This operation is performed to determine if the movement in the video data includes a gesture that corresponds to a function for the flight portal. If the input is a hand gesture that corresponds to a function the function is initiated (operation 1006) and a timer is started or reset (operation 1008). The process then proceeds to cycle back to operation 1000 and continues to monitor video data as described above.

Turning back to the determination made in operation 1002, if input is not present, a further determination is made as to whether a function has been initiated (operation 1010). If a function has not been initiated, the process returns to operation 1000. Otherwise, another determination is made as to whether a timer has expired (operation 1012). If the timer has expired, the flight portal is returned to a normal view (operation 1014) with the process returning to operation 1000.

Referring again to the determination made in operation 1012, if the timer has not expired, the process returns to operation 1000. Similarly, if a function is not initiated in operation 1010, the process also returns to operation 1000.

With reference again to operation 1004, if the input is not a hand gesture corresponding to a function, the process returns to operation 1000.

Figure 11:
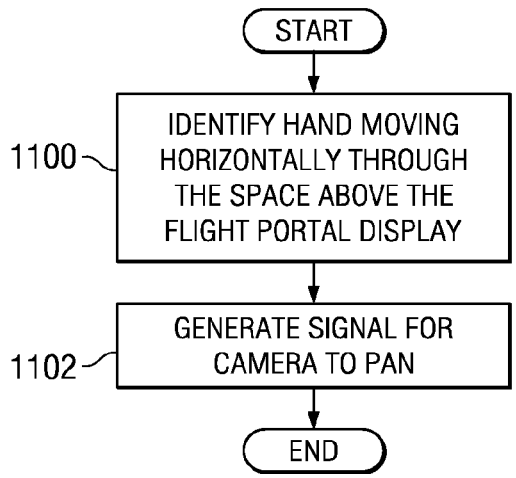
FIG. 11 is a flowchart of a process for panning an image in accordance with an advantageous embodiment of the present invention.

With reference next to FIG. 11, a flowchart of a process for panning an image is depicted in accordance with an advantageous embodiment of the present invention. The process in FIG. 11 is an example of a signal generated for use as an input for the determination in operation 920 in FIG. 9 and identifies the function initiated in operation 922 in FIG. 9.

The process begins by identifying a hand moving horizontally through the space above the flight portal display (operation 1100). A signal is generated for the image to pan (operation 1102). In operation 1102 and other operations in which the image is changed, the camera does not actually move for these particular illustrative embodiments. Instead, the video image and the overlaid graphics are digitally moved. For example, in operation 1102, the panning of the image only results in changing the image that is shown on the flight portal, rather than actually moving the camera. Of course, in other embodiments, the camera actually may move to provide the operation requested.

Figure 12:
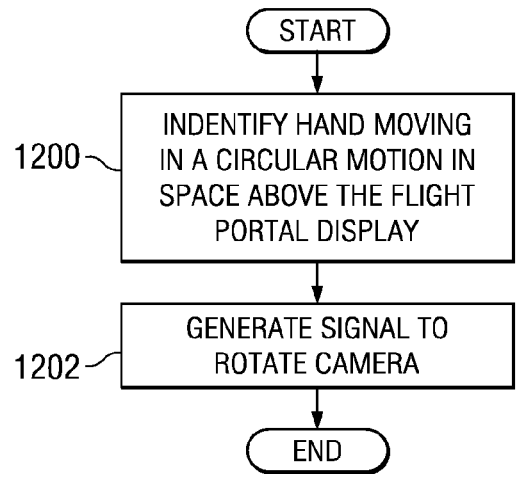
FIG. 12 is a flowchart of a process for rotating a view in accordance with an advantageous embodiment of the present invention.

With reference next to FIG. 12, a flowchart of a process for rotating a view is depicted in accordance with an advantageous embodiment of the present invention. The process in FIG. 12 is an example of a signal generated for use as an input for the determination in operation 920 in FIG. 9 and identifies the function initiated in operation 922 in FIG. 9.

The process begins by identifying a hand moving in a circular motion in the space above the flight portal display (operation 1200). A signal is generated to rotate the image (operation 1202). In this example, with the rotating of the image, the video image and the overlaid graphics are both rotated.

Figure 13:
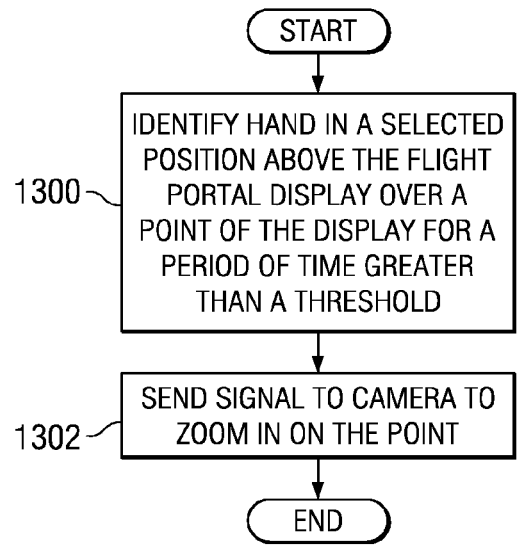
FIG. 13 is a flowchart of a process for zooming in on a location being displayed in a flight portal in accordance with an advantageous embodiment of the present invention.

Turning now to FIG. 13, a flowchart of a process for zooming in on a location being displayed in a flight portal is depicted in accordance with an advantageous embodiment of the present invention. The process in FIG. 13 is an example of a signal generated for use as an input for the determination in operation 920 in FIG. 9 and identifies the function initiated in operation 922 in FIG. 9.

The process begins by identifying a hand moving in a selected position above the flight portal display over a point of the display for a period of time greater than a threshold (operation 1300). A signal sent to the camera to zoom in on the point in the image (operation 1302). In this example, the zoom is a digital zoom using the data from the exterior video cameras. Additionally, the zoom operation also is performed on the graphics overlaid on the video image at that point.

Figure 14:
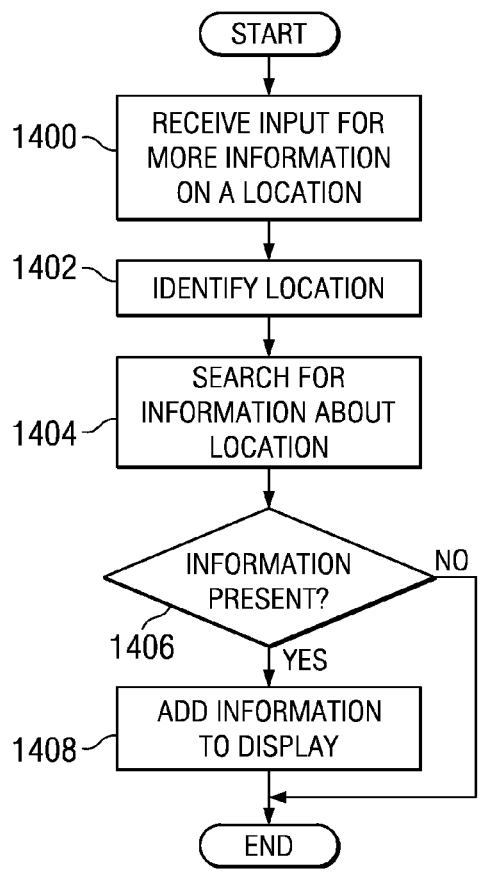
FIG. 14 is a flowchart of a process for displaying information about a location being displayed in a flight portal in accordance with an advantageous embodiment of the present invention.

Turning now to FIG. 14, a flowchart of a process for displaying information about a location being displayed in a flight portal is depicted in accordance with an advantageous embodiment of the present invention. The process in FIG. 14 is a function that is initiated when a gesture detection system indicates that more information is requested for a location. This request is generated by a gesture detection system when gesture in the form of a finger pointing to a location on the flight portal is present.

The process begins by receiving an input from a gesture detection system identifying a function to locate information about a location on the flight portal (operation 1400). The location is identified (operation 1402). In operation 1402, the process identifies a location on the ground based on the input from the gesture detection system that identifies the location on the flight portal. This identification may be made by correlating the location on the flight portal with the video data being displayed at that location.

The process then searches for information about the identified location (operation 1404). Next, a determination is made as to whether information about the identified location is present (operation 1406). If the information is present, the information is added to the display (operation 1408) with the process terminating thereafter. If the process determines in operation 1406 that the information about the identified location is not present, the process provides feedback that more information cannot be found and then terminates.

Figure 15:
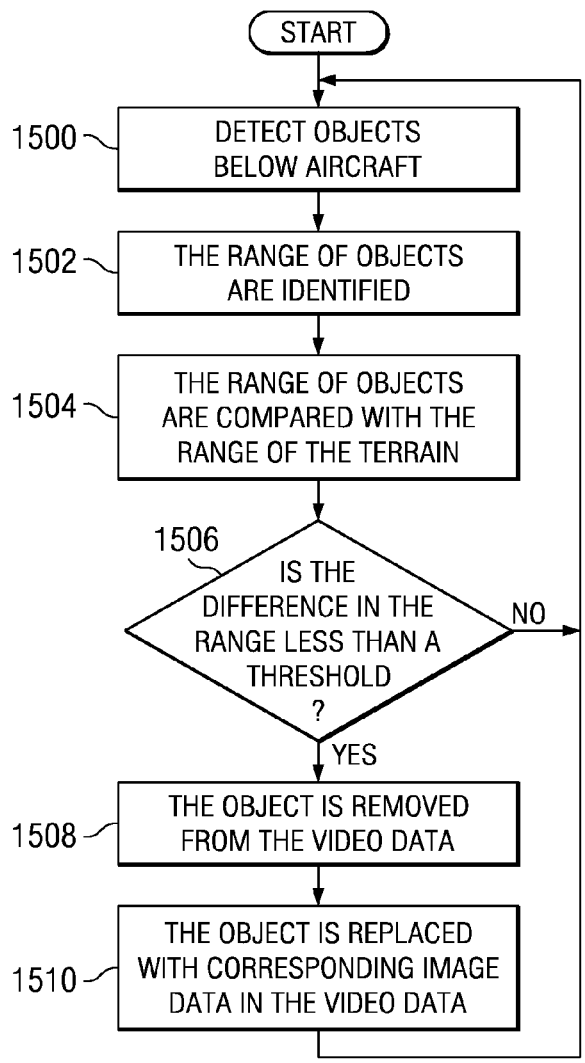
FIG. 15 is a flowchart illustrating a process for masking clouds in accordance with an advantageous embodiment of the present invention.

Turning now to FIG. 15, a flowchart illustrating a process for masking clouds is depicted in accordance with an advantageous embodiment of the present invention. The process illustrated in FIG. 15 may be implemented in a flight portal processor, such as flight portal processor 202 in FIG. 2. This process is used to detect objects, such as clouds, below the aircraft within the field of view of exterior video cameras.

The process begins by detecting objects below the aircraft (operation 1500). The detection of objects in operation 1500 may be performed using different mechanisms. For example, downward looking range finding equipment capable of detecting solid objects as well as condensed clouds may be used to identify range of the objects below the aircraft. This equipment may be, for example, radar or lidar. Alternatively, a cloud detection lidar (CDL) system may be used. Also, cloud location data currently detected by different organizations may be streamed to the aircraft from a remote location. This information is typically obtained through satellite based sensors that analyze reflections from the earth over several wave lengths to detect cloud cover.

Next, the range of the objects is identified (operation 1502). The range of the objects is compared with the range of the terrain (operation 1504). The determination is made as to whether the difference in the range is less than a threshold (operation 1506). This range data is compared to determine whether clouds are present. Clouds are assumed to exist when the range of the objects is closer to the aircraft than the terrain than would be expected based on the aircrafts current location and altitude. This threshold may vary depending on the particular implementation.

If the difference is less than a threshold, the object is removed from the video data (operation 1508). Thereafter, the object is replaced with corresponding image data in the video data (operation 1510) with the process then returning to operation 1500. With reference again to operation 1506, if the difference in the range is not within the threshold, the process returns to operation 1500 as described above.

The replacement of data may be from a different image sources. For example, corresponding video data from a downward looking millimeter-wave radar camera may be used. Alternatively, satellite and/or aerial images may be used to replace the object. As another alternative, other maps, images, text, or graphics may be used to replace the object. Another example is, a shaded map of the terrain derived from an on-board terrain profile database. In this manner, objects, such as clouds, may be removed from the video data and replaced with corresponding images that show the terrain that would be expected to be seen if the clouds were absent. Of course, other images may be used to replace the clouds depending on the particular implementation.

Thus, the advantageous embodiments of the present invention provide a flight portal that is attached or integrated into the floor of an aircraft. The flight portal in the advantageous embodiments may be flush with the floor, slightly inset, or positioned above the floor providing a virtual view of the ground or terrain outside of the aircraft. This flight portal is typically positioned horizontally or slightly inclined relative to the length of the aircraft. The flight portal uses real time flight views that may be overlaid with information. This information may be, for example, maps, identification of areas or locations, such as countries and cities. Further, the information may include points of interest, such as mountains, lakes, rivers, and oceans. The view display through the flight portal may be controlled by passengers to provide additional information or change views.

The information displayed on the flight portal may be transferred to personal devices of passengers. For example, video data or screen shots of the ground may be transferred to the personal device of a passenger. The information about cities, countries, or points of interest also may be transferred to the personal device of a passenger.

In this manner, the flight portal system described in the different advantageous embodiments provides passengers an ability to see what they are flying over. In this manner, passengers may see much more of the earth than they presently can when flying in an aircraft. The different embodiments allow passengers to see real time views associated with their flight.

Further, a system may be used to generate revenue to make the feature available. Additionally, passengers may be billed for information or views transmitted to personal computing devices, such as PDA's, mobile phones, and laptop computers.

Moreover, the flight portal system provides an ability to encourage passengers to move around the aircraft during the flight. Today, on long flights, passengers tend not to move around the cabin and it is healthier for passengers to get out of their seats and move around during these types of flights. The flight portal provides passengers a place to go to during the flight. The flight portal system provides an ability to orient passengers by reconnecting these passengers to the earth. Also, the flight portal system reduces the need for flight attendants and pilots to provide passengers with information about what they are flying over, connections, and other information.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The description of the present invention has been presented for purposes of illustration and description, and is not intended to be exhaustive or limited to the invention in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the invention, the practical application, and to enable others of ordinary skill in the art to understand the invention for various embodiments with various modifications as are suited to the particular use contemplated.

What is claimed is:

1. A method for displaying a terrain image, comprising:
   receiving a moving video image of terrain obtained from an aircraft flying above the terrain as the aircraft is flying above the terrain;
   detecting an image of an object in the image of the terrain for an object that is positioned between the terrain and the aircraft flying above the terrain;
   replacing the detected image of the object in the image of the terrain with replacement image data; and
   displaying the moving video image of the terrain with the replacement image data on a display device in the aircraft as the aircraft is flying above the terrain, wherein the display device is substantially flush with a floor in the aircraft.

2. The method of claim 1, wherein receiving the moving video image of the terrain comprises receiving the moving video image of the terrain from a video camera positioned on the aircraft.

3. The method of claim 1, wherein detecting the image of the object comprises detecting an image of a cloud in the image of the terrain.

4. The method of claim 3, wherein detecting the image of the cloud comprises detecting a cloud in a field of view of the image of the terrain using a cloud detection lidar.

5. The method of claim 3, wherein detecting the image of the cloud comprises detecting a cloud in a field of view of the image of the terrain using satellite based sensors.

6. The method of claim 1, wherein detecting the image of the object comprises:
   detecting an object in a field of view of the image of the terrain from the aircraft;
   determining a first range of the object from the aircraft;
   determining a second range of the terrain from the aircraft;
   determining a difference between the first range and the second range; and
   detecting the image of the object in the image of the terrain responsive to the difference satisfying a threshold.

7. The method of claim 1, wherein replacing the detected image of the object comprises replacing the detected image of the object in the image of the terrain with image data for a portion of the terrain below the object.

8. A method for displaying an image of the surface of the earth below an aircraft, comprising:
   receiving a moving video image of the surface of the earth below the aircraft from a camera on the aircraft;
   detecting an image of a cloud in the image of the surface of the earth for a cloud that is positioned between the surface of the earth below the aircraft and the aircraft;
   replacing the detected image of the cloud in the image of the surface of the earth with replacement image data for the surface of the earth below the aircraft from an image source other than the camera; and
   displaying the moving video image of the surface of the earth with the replacement image data on a display device in the aircraft, wherein the display device is substantially flush with a floor in the aircraft.

9. The method of claim 8, wherein detecting the image of the cloud comprises detecting a cloud in a field of view of the camera using cloud detection equipment on the aircraft.

10. The method of claim 8, wherein detecting the image of the cloud comprises detecting a cloud in the field of view of the camera from cloud location data provided to the aircraft from a remote location.

11. The method of claim 8, wherein detecting the image of the cloud comprises:
   detecting an object in a field of view of the camera;
   determining a first range of the object from the aircraft;
   determining a second range of terrain below the aircraft from the aircraft;
   determining a difference between the first range and the second range; and
   determining that the object corresponds to a cloud in the field of view of the camera responsive to the difference satisfying a threshold.

12. The method of claim 8, wherein the replacement image data is selected from the group of replacement image data for a portion of the surface of the earth below the cloud consisting of data from a millimeter-wave radar camera on the aircraft, satellite image data, aerial image data, and map data.

13. A display apparatus, comprising:
   a display device on an aircraft, wherein the display device is substantially flush with a floor in the aircraft; and
   a processor connected to the display device, wherein the processor is configured to receive a moving video image of terrain obtained from the
   aircraft as the aircraft is flying above the terrain,
      detect an image of an object in the image of the terrain for an object that is positioned between the terrain and the aircraft flying above the terrain,
      replace the detected image of the object in the image of the terrain with replacement image data, and
      display the moving video image of the terrain with the replacement image data on the display device.

14. The display apparatus of claim 13, further comprising:
   a camera on the aircraft, wherein the camera is connected to the processor and wherein the processor receives the moving video image of the terrain from the camera.

15. The display apparatus of claim 13, wherein the object is a cloud and wherein the processor is configured to detect an image of the cloud in the image of the terrain by:
   detecting an object in a field of view of the image of the terrain;
   determining a first range of the object from the aircraft;
   determining a second range of the terrain from the aircraft;
   determining a difference between the first range and the second range; and
   determining that the object corresponds to a cloud in the image of the terrain responsive to the difference satisfying a threshold.

* * * * *